United States Patent
Kwon et al.

(10) Patent No.: US 11,967,157 B2
(45) Date of Patent: Apr. 23, 2024

(54) ROBOT AND METHOD FOR CONTROLLING THEREOF

(71) Applicant: SAMSUNG ELECTRONICS CO., LTD., Suwon-si (KR)

(72) Inventors: Soonbeom Kwon, Suwon-si (KR); Youngil Koh, Suwon-si (KR); Aron Baik, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 343 days.

(21) Appl. No.: 17/546,826

(22) Filed: Dec. 9, 2021

(65) Prior Publication Data

US 2023/0058999 A1 Feb. 23, 2023

Related U.S. Application Data

(63) Continuation of application No. PCT/KR2021/016429, filed on Nov. 11, 2021.

(30) Foreign Application Priority Data

Aug. 20, 2021 (KR) .................. 10-2021-0110412

(51) Int. Cl.
*G01S 17/89* (2020.01)
*G01S 17/931* (2020.01)
(Continued)

(52) U.S. Cl.
CPC ............. *G06V 20/58* (2022.01); *G01S 17/89* (2013.01); *G01S 17/931* (2020.01);
(Continued)

(58) Field of Classification Search
CPC ..... G01S 17/931; G01S 17/89; G01C 21/206; G01C 21/383; G05D 1/0274;
(Continued)

(56) References Cited

U.S. PATENT DOCUMENTS 7,584,020 B2  9/2009  Bruemmer et al.
7,933,686 B2  4/2011  Myeong et al.
(Continued)

FOREIGN PATENT DOCUMENTS

JP         4243594 B2   3/2009
KR       100791386 B1   1/2008
(Continued)

OTHER PUBLICATIONS

Zhou et al., Data Processing in Current 3D Robotic Perception Systems, 2015, IEEE, p. 767-794 (Year: 2015).*

(Continued)

*Primary Examiner* — McDieunel Marc
(74) *Attorney, Agent, or Firm* — Sughrue Mion, PLLC

(57) ABSTRACT

A robot may include a LiDAR sensor, and a processor configured to acquire, based on a sensing value of the LiDAR sensor, a first map that covers a space where the robot is located, detect one or more obstacles existing in the space based on the sensing value of the LiDAR sensor, acquire a number of times that each of a plurality of areas in the first map is occupied by the one or more obstacles, based on location information of the one or more obstacles, determine an obstacle area based on the number of times that each of the plurality of areas is occupied by the one or more obstacles, and acquire a second map indicating the obstacle area on the first map to determine a driving route of the robot based on the second map.

20 Claims, 9 Drawing Sheets

(51) Int. Cl.
*G05D 1/00* (2006.01)
*G06T 7/62* (2017.01)
*G06V 10/762* (2022.01)
*G06V 20/58* (2022.01)

(52) U.S. Cl.
CPC ......... *G05D 1/0214* (2013.01); *G05D 1/0231* (2013.01); *G06T 7/62* (2017.01); *G06V 10/762* (2022.01); *G06T 2207/10028* (2013.01); *G06T 2207/30252* (2013.01)

(58) Field of Classification Search
CPC .... G05D 1/0214; G05D 1/0231; G05D 1/024; G05D 1/0248; G05D 2201/0211; G06V 10/762; G06V 20/58; G06T 7/73; G06T 7/62; G06T 2207/30241; G06T 2207/30261; G06T 2207/10028; G06T 2207/30252; G06T 2207/10016
See application file for complete search history.

(56) References Cited

U.S. PATENT DOCUMENTS

| | | | |
|---|---|---|---|
| 8,060,254 | B2 | 11/2011 | Myeong et al. |
| 8,234,032 | B2 | 7/2012 | Lee et al. |
| 11,016,491 | B1 | 5/2021 | Millard |
| 11,185,982 | B2 * | 11/2021 | Lee ............... G05D 1/0274 |
| 11,199,853 | B1 * | 12/2021 | Afrouzi ............ G05D 1/0246 |
| 11,269,343 | B2 | 3/2022 | Park et al. |
| 11,348,269 | B1 * | 5/2022 | Ebrahimi Afrouzi ..... G06T 7/33 |
| 11,372,418 | B2 * | 6/2022 | Kim ............... B60L 58/10 |
| 11,385,643 | B2 * | 7/2022 | Maeng ............ G05D 1/0246 |
| 11,429,113 | B2 * | 8/2022 | Lee ............... G05D 1/0276 |
| 11,435,746 | B1 * | 9/2022 | Ebrahimi Afrouzi ... A47L 9/009 |
| 11,449,061 | B2 * | 9/2022 | Ebrahimi Afrouzi ....... G05D 1/0219 |
| 11,480,974 | B2 | 10/2022 | Lee et al. |
| 2019/0310653 | A1 | 10/2019 | Lee et al. |
| 2020/0012292 | A1 | 1/2020 | Park et al. |
| 2020/0341479 | A1 | 10/2020 | Kim et al. |
| 2021/0018929 | A1 | 1/2021 | Choi |

FOREIGN PATENT DOCUMENTS

| | | |
|---|---|---|
| KR | 100834571 B1 | 6/2008 |
| KR | 100843085 B1 | 7/2008 |
| KR | 101240181 B1 | 3/2013 |
| KR | 101382982 B1 | 4/2014 |
| KR | 101864949 B1 | 7/2018 |
| KR | 10-2017148 B1 | 9/2019 |
| KR | 10-2019-0119222 A | 10/2019 |
| KR | 102070067 B1 | 1/2020 |
| KR | 10-2020-0087362 A | 7/2020 |
| KR | 102169283 B1 | 10/2020 |
| KR | 10-2021-0009011 A | 1/2021 |
| KR | 10-2286656 B1 | 8/2021 |
| KR | 10-2466940 B1 | 11/2022 |

OTHER PUBLICATIONS

Camargo et al., Mobile Robot Autonomous Exploration and Navigation in Large-scale Indoor Environments, 2019, IEEE, p. 106-111 (Year: 2019).*

Al-Mashhadani et al., Autonomous Exploring Map and Navigation for an Agricultural Robot, 2020, IEEE, p. 73-78 (Year: 2020).*

Saleem et al., An integration framework for UGV outdoor navigation system based on LiDAR and vision data, 2015, IEEE, p. 1-6 (Year: 2015).*

International Search Report and Written Opinion dated Apr. 25, 2022, issued by the International Searching Authority in International Application No. PCT/KR2021/016429 (PCT/ISA/210 and PCT/ISA/237).

* cited by examiner

ROBOT AND METHOD FOR CONTROLLING THEREOF

CROSS-REFERENCE TO RELATED APPLICATION(S)

This application is a bypass continuation of International Application No. PCT/KR2021/016429, filed on Nov. 11, 2021, which is based on and claims priority to Korean Patent Application No. 10-2021-0110412, filed on Aug. 20, 2021, in the Korean Patent Office, the disclosures of which are incorporated by reference herein in their entireties.

BACKGROUND

Field

The disclosure relates to a robot and a method for controlling thereof. More particularly, the disclosure relates to a robot configured to generate a map based on locations of obstacles, and generate a driving route of the robot based on the generated map, and a method for controlling thereof.

Description of Related Art

With the development of electronic technology, various robots have been developed to replace human jobs. For example, a serving robot performs a role of a human server in a restaurant. Serving robots drive autonomously in restaurants, serve food or carry dishes.

SUMMARY

According to an existing motion planning algorithm, since a serving robot plans a driving route only considering its size and whether it will or will likely collide with an obstacle, the serving robot may select a route that traverses a space under a table or a space between chairs in some cases. The robot's driving route planning may not be reasonable for most humans, and may significantly reduce service efficiency especially when the robot moves to a space where the robot will likely to be stuck. In addition, as the serving robot drives between tables, safety problems such as collisions between serving robots and restaurant customers may occur.

Accordingly, there is a need for a technology that enables the robot to plan a reasonable driving route by itself and to increase work efficiency of the robot.

One technical problem to be solved by the disclosure is to provide a technology for generating a driving route of a robot based on the number of times an obstacle is detected (e.g., the number of times occupancy has occurred) for each area of a space (e.g., each of a plurality of cells in a map covering a target space such as a restaurant) in which the robot is located.

The technical problems of the disclosure are not limited to the technical problems described above, and the other technical problems not described will be clearly understood by those skilled in the art from the following description.

According to an aspect of the disclosure, a robot may include: a light detection and ranging (LiDAR) sensor; a memory configured to store at least one instruction; and at least one processor configured to execute the at least one instructions to: acquire, based on a sensing value of the LiDAR sensor, a first map that covers a space where the robot is located, detect one or more obstacles existing in the space based on the sensing value of the LiDAR sensor, acquire a number of times that each of a plurality of areas in the first map is occupied by the one or more obstacles, based on location information of the one or more obstacles, determine an obstacle area based on the number of times that each of the plurality of areas is occupied by the one or more obstacles, and acquire a second map indicating the obstacle area on the first map to determine a driving route of the robot based on the second map.

The at least one processor may be further configured to execute the at least one instructions to: obtain an occupancy frequency of each of the plurality of areas, based on the number of times that each of the plurality of areas is occupied by the one or more obstacles, acquire a weight value corresponding to each of the plurality of areas based on the occupancy frequency and a predefined function, identify at least one area corresponding to the weight value greater than a predetermined value among the plurality of areas, and determine the obstacle area based on information of the at least one area.

The at least one processor may be further configured to execute the at least one instructions to: cluster the at least one area to determine the obstacle area including the at least one area.

The at least one processor may be further configured to execute the at least one instructions to: obtain an occupancy frequency of each of the plurality of areas, based on the number of times that each of the plurality of areas is occupied by the one or more obstacles, identify at least one area having the occupancy frequency that is greater than a threshold value among the plurality of areas, and determine the obstacle area based on the information of the at least one area.

The at least one processor may be further configured to execute the at least one instructions to: identify a plurality of coordinates corresponding to a plurality of locations at which the one or more obstacles are detected, based on a density of the plurality of coordinates in the plurality of areas, perform clustering on the plurality of coordinates to define a cluster composed of at least one of the plurality of coordinates, and determine an area corresponding to the plurality of coordinates included in the cluster as the obstacle area.

The robot may further include: a driver, wherein the processor may be further configured to execute the at least one instructions to generate the driving route that bypasses the obstacle area based on the second map, and control the driver such that the robot moves along the driving route.

The at least one processor may be further configured to execute the at least one instructions to: acquire an occupancy frequency of each of the plurality of areas based on the sensing value of the LiDAR sensor acquired while the robot moves to a predetermined destination, and update the second map based on the occupancy frequency.

The at least one processor may be further configured to execute the at least one instructions to: apply the sensing value of the LiDAR sensor to simultaneous localization and mapping (SLAM) algorithm to acquire location information of the robot, and acquire coordinates of the one or more obstacles on the first map based on the location information of the robot and the location information of the one or more obstacles.

According to another aspect of the disclosure, a method for controlling a robot including a light detection and ranging (LiDAR) sensor, may include: acquiring, based on a sensing value of the LiDAR sensor, a first map that covers a space where the robot is located; detecting one or more obstacles existing in the space based on the sensing value of the LiDAR sensor; acquiring a number of times that each of a plurality of areas in the first map is occupied by the one or more obstacles, based on location information of the one or more obstacles; determining an obstacle area based on the number of times that each of the plurality of areas is occupied by the one or more obstacles; and acquiring a second map indicating the obstacle area on the first map to determine a driving route of the robot based on the second map.

The determining the obstacle area comprises: obtaining an occupancy frequency of each of the plurality of areas, based on the number of times that each of the plurality of areas is occupied by the one or more obstacles; acquiring a weight value corresponding to each of the plurality of areas based on the occupancy frequency and a predefined function; identifying at least one area corresponding to the weight value greater than a predetermined value among the plurality of areas; and determining the obstacle area based on information of the at least one area.

The determining the obstacle area may further include clustering the at least one area to determine the obstacle area including the at least one area.

The determining the obstacle area may include: obtaining the an occupancy frequency of each of the plurality of areas, based on the number of times that each of the plurality of areas is occupied by the one or more obstacles; identifying at least one area having the occupancy frequency that is greater than a threshold value among the plurality of areas, and determining the obstacle area based on the information of the at least one area.

The determining the obstacle area may include: identifying a plurality of coordinates corresponding to a plurality of locations at which the one or more obstacles are detected; based on a density of the plurality of coordinates in the plurality of areas, performing clustering on the plurality of coordinates to define a cluster composed of at least one of the plurality of coordinates, and determining an area corresponding to the plurality of coordinates included in the cluster as the obstacle area.

The method may further include: generating the driving route that bypasses the obstacle area based on the second map; and controlling a driver of the robot such that the robot moves along the driving route.

The method may further include: acquiring an occupancy frequency of each of the plurality of areas based on the sensing value of the LiDAR sensor acquired while the robot moves to a predetermined destination; and updating the second map based on the occupancy frequency.

According to another aspect of the disclosure a non-transitory computer-readable storage medium may store a program that is executable by at least one processor to perform a method of processing data for motion planning. The method may include: acquiring a space map of a target space; dividing an area of the space map into a plurality of cells; identifying an occupancy frequency of each of the plurality of cells by counting a number of times that occupancy has occurred in each of the plurality of cells; identifying two or more cells, each of which has the occupancy frequency higher than or equal to a threshold value, among the plurality of cells; clustering the two or more cells and at least one neighbor cell of the two or more cells into an integrated obstacle area; and acquiring a driving map based on the space map and the integrated obstacle area.

The acquiring the space map of the target space may include: acquiring the space map using a light detection and ranging (LiDAR) sensor located in the target space.

The dividing the area of the space map into the plurality of cells may include: dividing the area of the space map into the plurality of cells in a two-dimensional (2D) grid form.

The occupancy frequency of the at least one neighbor cell may be lower than the threshold value. The clustering the two or more cells and the at least one neighbor cell of the two or more cells into the integrated obstacle area may include: selecting the at least one neighbor cell, from the plurality of cells to be clustered with the two or more cells, based on distance between the at least one neighbor cell and the two or more cells being less than a predetermined distance.

The method further may include: based on the driving map, controlling a robot, to move around the integrated obstacle area to reach a destination.

According to various embodiments of the disclosure as described above, the robot may generate an efficient driving route and the robot's work efficiency may be improved, thereby increasing convenience and satisfaction of users.

In addition, effects acquirable or predicted by the embodiments of the disclosure are to be disclosed directly or implicitly in the detailed description of the embodiments of the disclosure. For example, various effects predicted according to embodiments of the disclosure will be disclosed in the detailed description to be described below.

Other aspects, advantages and prominent features of the disclosure will become apparent to those skilled in the art from the following detailed description, which discloses various embodiments of the disclosure taken in conjunction with the accompanying drawings.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
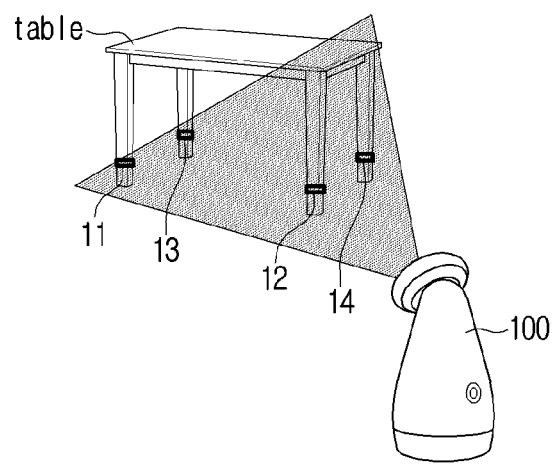
FIG. 1 is a view illustrating an operation of a robot according to an embodiment.
Figure 1:
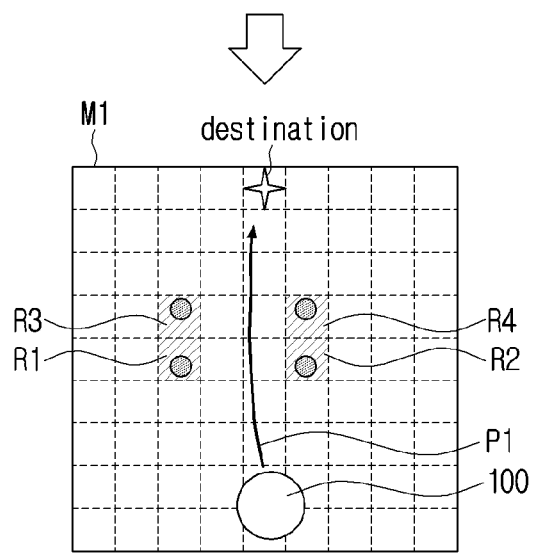
Figure 1:
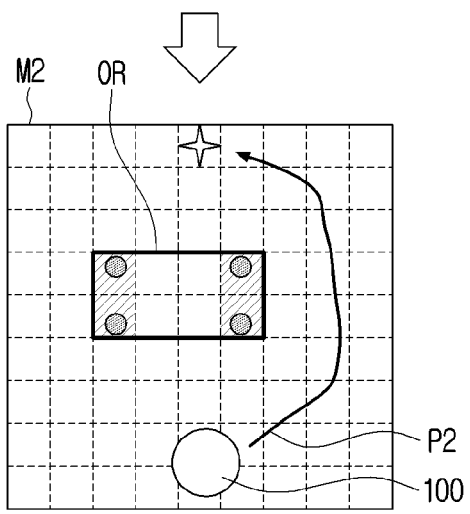

The terms used in example embodiments will be briefly explained, and example embodiments will be described in greater detail with reference to the accompanying drawings.

Terms used in the disclosure are selected as general terminologies currently widely used in consideration of the configuration and functions of the disclosure, but can be different depending on intention of those skilled in the art, a precedent, appearance of new technologies, and the like. Further, in specific cases, terms may be arbitrarily selected.

In this case, the meaning of the terms will be described in the description of the corresponding embodiments. Accordingly, the terms used in the description should not necessarily be construed as simple names of the terms, but be defined based on meanings of the terms and overall contents of the disclosure.

The example embodiments may vary, and may be provided in different example embodiments. Various example embodiments will be described with reference to accompanying drawings. However, this does not necessarily limit the scope of the exemplary embodiments to a specific embodiment form. Instead, modifications, equivalents and replacements included in the disclosed concept and technical scope of this specification may be employed. While describing exemplary embodiments, if it is determined that the specific description regarding a known technology obscures the gist of the disclosure, the specific description is omitted.

The terms such as "first," "second," and so on may be used to describe a variety of elements, but the elements should not be limited by these terms. The terms used herein are solely intended to explain specific example embodiments, and not to limit the scope of the disclosure.

Singular forms are intended to include plural forms unless the context clearly indicates otherwise. In the present application, the terms "include" and "comprise" designate the presence of features, numbers, steps, operations, components, elements, or a combination thereof that are written in the specification, but do not exclude the presence or possibility of addition of one or more other features, numbers, steps, operations, components, elements, or a combination thereof.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

The example embodiments of the disclosure will be described in greater detail below in a manner that will be understood by one of ordinary skill in the art. However, exemplary embodiments may be realized in a variety of different configurations, and not limited to descriptions provided herein. Also, well-known functions or constructions are not described in detail since they would obscure the embodiments with unnecessary detail.

FIG. 1 is a view illustrating an operation of a robot according to an embodiment of the disclosure.

Referring to FIG. 1, a robot 100 may detect obstacles 11, 12, 13, and 14 using a light detection and ranging (LiDAR) sensor, and acquire location information on the obstacles 11, 12, 13 and 14. The obstacles 11, 12, 13, 14 may be legs of a table.

The robot 100 may acquire a first map (e.g., a space map) M1 corresponding to a space located in the robot 100 by using the LiDAR sensor. The first map M1 may include a plurality of areas including areas R1, R2, R3, and R4, respectively, corresponding to locations where the obstacles 11, 12, 13, and 14 are detected. Also, the first map M1 may include location information on a destination. For example, the robot 100 may define a two-dimensional (2D) matrix of cells, each of which represents a certain (square) area of the space and stores a probability of being occupied (e.g., a probability that an obstacle occupies that cell. Areas R1, R2, R3, and R4 may be also referred to as cells R1, R2, R3, and R4.

When an existing robot generates a driving route based on the first map M1, the existing robot may generate a first route P1 passing between the areas R1, R2, R3, and R4 to move to a destination by a shortest route. However, if the obstacles 11, 12, 13, and 14 are moving objects such as humans, the existing robot may collide with the obstacles or causes inconvenience to the humans. Also, if a table is located in the areas R1, R2, R3, and R4, a collision may occur because a height of the existing robot is higher than a height of the table.

To solve this problem, the robot 100 according to embodiments may define an obstacle area OR based on the areas R1, R2, R3, and R4. For example, the robot 100 may acquire the obstacle area OR by clustering the areas R1, R2, R3, and R4. In addition, the robot 100 may generate a second map (e.g., a driving map) M2 based on the first map M1 and the obstacle area OR. The robot 100 may generate a driving route based on a second map M2. For example, the robot 100 may generate a second route P2 bypassing the obstacle area OR. The robot 100 may drive along the second route P2. Accordingly, the robot 100 may not cause inconvenience to the user and move to a destination without colliding with the obstacles 11, 12, 13, and 14.

Figure 2:
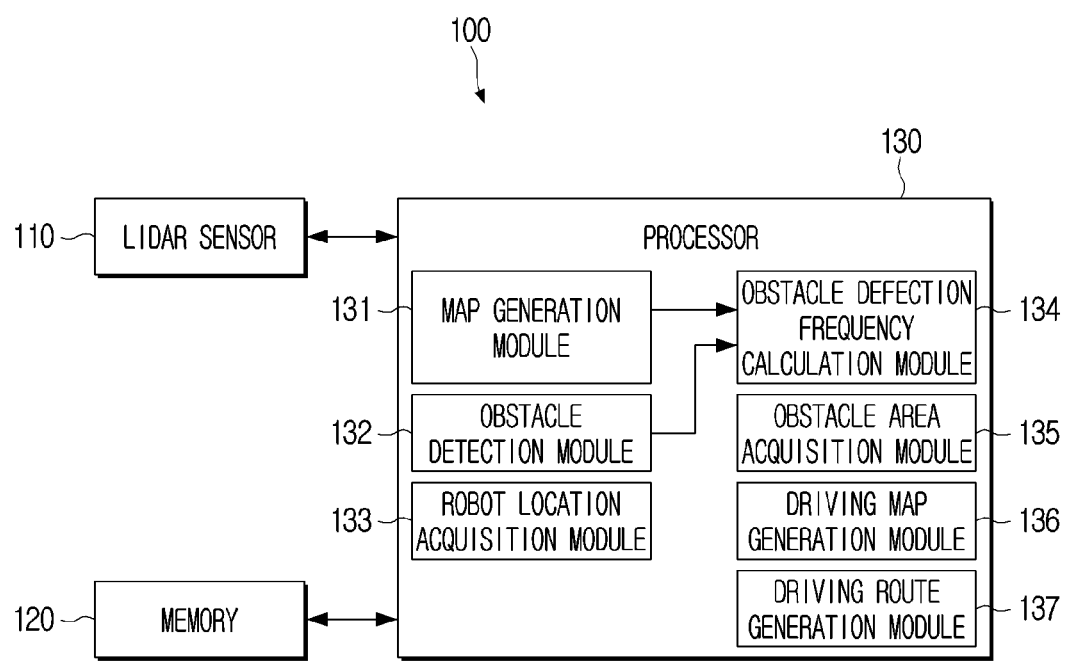
FIG. 2 is a block diagram illustrating a configuration of a robot according to an embodiment.

FIG. 2 is a block diagram illustrating a configuration of a robot according to an embodiment of the disclosure.

Referring to FIG. 2, the robot 100 may include a LiDAR sensor 110, a memory 120, and a processor 130. The robot 100 may be a service robot. For example, the robot 100 may be a serving robot. However, this is only an embodiment, and the type of the robot 100 may be various. The configuration of the robot 100 is not limited to the configuration shown in FIG. 2, and a configuration obvious to those skilled in the art may be added.

The LiDAR sensor 110 is configured to acquire depth information on a circumstance around the robot 100. For example, the LiDAR sensor 110 may acquire a point cloud for the surrounding circumstance while the robot 100 is driving. The processor 130 may detect an obstacle based on the point cloud acquired through the LiDAR sensor 110 and acquire location information on the obstacle. The location information on the obstacle may include a relative location of the obstacle with respect to the robot 100 (e.g., a distance between the robot 100 and the obstacle).

The memory 120 may store an operating system (OS) for controlling overall operations of components of the robot 100 and commands or data related to the components of the robot 100. For example, the memory 120 may store a map corresponding to a space in which the robot 100 is located.

The memory 120 may store data necessary for the module for controlling the operation of the robot 100 to perform various operations. A module for controlling the operation of the robot 100 may include a map generation module 131, an obstacle detection module 132, a robot location acquisition module 133, an obstacle detection frequency calculation module 134, and an obstacle area acquisition module 135, a driving map generation module 136 and a driving route generation module 137. The memory 120 may be implemented as a non-volatile memory (e.g., a hard disk, a solid state drive (SSD), a flash memory), a volatile memory, or the like.

The processor 130 may be electrically connected to the memory 120 to control overall functions and operations of the robot 100. The processor 130 may load data for performing various operations of modules 131 to 137 stored in the non-volatile memory into the volatile memory. Here, the loading refers to an operation of loading and storing data stored in the non-volatile memory into the volatile memory such that it can be accessed by the processor 130.

The map generation module 131 may acquire a first map covering the space in which the robot 100 is located based on a sensing value of the LiDAR sensor 110. The map generation module 131 may generate a first map by applying simultaneous localization and mapping (SLAM) algorithm to point cloud information acquired through the LiDAR sensor 110. The first map may include location information on the robot 100 and location information on the obstacle detected by the obstacle detection module 132. The SLAM algorithm may be stored in the memory 120.

The obstacle detection module 132 may detect an obstacle around the robot 100 based on the sensing value of the LiDAR sensor 110. The obstacle detection module 132 may acquire location information on the obstacle based on the sensing value of the LiDAR sensor 110. The location information on the obstacle may include information on a relative location of the obstacle with respect to the robot 100. For example, the information on the relative location of the obstacle may include a distance relative angle between the robot 100 and the obstacle.

The location information on the obstacle may include information on an absolute location of the obstacle. The information on the absolute location of the obstacle may include coordinates (e.g., x and y coordinates) of a position of an obstacle on the first map generated through the map generation module 131. The robot 100 may acquire information on the absolute location of the obstacle based on the information on the relative location of the obstacle and the location information on the robot 100 acquired by the robot location acquisition module 133.

The robot location acquisition module 133 may acquire current location information and posture information on the robot 100. The robot location acquisition module 133 may acquire (x, y) coordinates corresponding to a location of the robot 100 on the first map and a direction that the robot 100 is looking. For example, the robot location acquisition module 133 may apply the simultaneous localization and mapping (SLAM) algorithm to the point cloud information acquired through the LiDAR sensor 110 to acquire the location information and posture information on the robot 100.

The obstacle detection frequency calculation module 134 may acquire the number of times that obstacles for each area included in the first map are detected. The obstacle detection frequency calculation module 134 may calculate a frequency at which obstacles for each of a plurality of areas are detected (e.g., a frequency at which each of the plurality of areas is occupied by one or more obstacles) based on the number of times the obstacle (or any other obstacles) is detected in each of the plurality of areas. The frequency at which the obstacle is detected may mean how often the obstacle is located in a specific area. The obstacle detection frequency calculation module 134 may calculate the frequency at which the obstacles are detected based on the number of times the obstacles for each of the plurality of areas are detected for a predetermined time. As the number of times the obstacle is detected increases, the frequency at which the obstacle is detected may increase. In other words, as the number of times occupancy is detected in an area increases, the probability that the area is occupied (i.e., the probability that an obstacle occupies the area) increases. When the first map is divided into a plurality of cells in a grid form, the obstacle detection frequency calculation module 134 may detect whether occupancy occurs in each of the plurality of cells to determine an occupancy probability for each of the plurality of cells.

The obstacle area acquisition module 135 may define an obstacle area based on the frequency at which obstacles are detected in a plurality of areas included in the first map. The obstacle area acquisition module 135 may acquire a plurality of weight values corresponding to each of the plurality of areas based on a frequency at which an obstacle is detected and a predefined function. For example, the predefined function may be an exponential linear unit (ELU) function in which an x-axis represents a frequency and a y-axis represents a weight value. Thus, if the frequency is less than a threshold value, the weight value may be zero, and if the frequency exceeds the threshold value, the weight value may have a value greater than zero. And, when the frequency is greater than the threshold value, the weight value may increase as the frequency increases. The obstacle area acquisition module 135 may identify a frequency corresponding to each of the plurality of areas, and acquire a weight value corresponding to the identified frequency.

The obstacle area acquisition module 135 may identify at least one area based on a weight value corresponding to each of the plurality of areas. The obstacle area acquisition module 135 may identify at least one area corresponding to a weight value greater than the predetermined value among the plurality of areas.

The obstacle area acquisition module 135 may acquire an obstacle area based on at least one area. For example, the obstacle area acquisition module 135 may determine an obstacle area including at least one area by clustering at least one area. In particular, the obstacle area acquisition module 135 may perform clustering based on a density of at least one area. A density of the at least one area may refer to a degree to which the at least one area is dense with each other. Accordingly, the closer the distance between the at least one area is, the higher the density may be. For example, referring to FIG. 1, when the first map is divided into 9 by 9 cells, composed of cell 1 to cell 81, and when a weight assigned to each of cells R1, R2, R3, and R4 according to an occupancy frequency of cells R1, R2, R3, and R4 is greater than the predetermined value, the obstacle area acquisition module 135 may compute distances between neighbor cells and each of cells R1, R2, R3, and R4 to determine whether to combine the neighbor cells and cells R1, R2, R3, and R4 as a single integrated obstacle area, based on the computed distances being less that a predetermined distance.

The obstacle area acquisition module 135 may acquire information on the obstacle area. The information on the obstacle area may include location information on the obstacle area. The location information on the obstacle area may include coordinates corresponding to a boundary of the obstacle area.

The driving map generation module 136 may generate a second map based on the first map and information on the obstacle area. The second map may refer to a driving map used when generating a driving route of the robot 100. The second map may include information on the obstacle area, location information on the robot 100, and location information on the detected obstacle. The driving map generation module 136 may store the second map in the memory 120.

The driving map generation module 136 may update the second map. The driving map generation module 136 may update the second map at a predetermined time interval. Alternatively, the driving map generation module 136 may update the second map when a predetermined event occurs. For example, the predetermined event may include an event in which a frequency of an obstacle area acquired after the second map is generated becomes smaller than a predetermined value. Also, the predetermined event may include an event in which a user command for updating the second map is acquired.

The driving route generation module 137 may generate a driving route of the robot 100 based on the second map. For example, the driving route generation module 137 may generate a driving route that bypasses an obstacle area and moves to a destination based on current location information on the robot 100, location information on the destination, and location information on the obstacle area. The generated driving route may be stored in the memory 120.

Although FIG. 2 illustrates that the map generation module 131, the obstacle detection module 132, the robot location acquisition module 133, the obstacle detection frequency calculation module 134, the obstacle area acquisition module 135, the driving map generation module 136, and the driving route generation module 137 are included in the robot 100, but the embodiment is not limited thereto. In an embodiment, one or more modules in the robot 100 may be included in an external server, and the robot 100 may transmit sensing data of the LiDAR sensor 110 to the external server via a communication interface, and may receive the second map from the external server via the communication interface.

In the disclosure, a map may be divided into a plurality of grid cells having a constant size, and a plurality of areas included in the map may be referred to as a plurality of cells. For example, in FIG. 3, a first area R31 may be referred to as a first cell.

Figure 3:
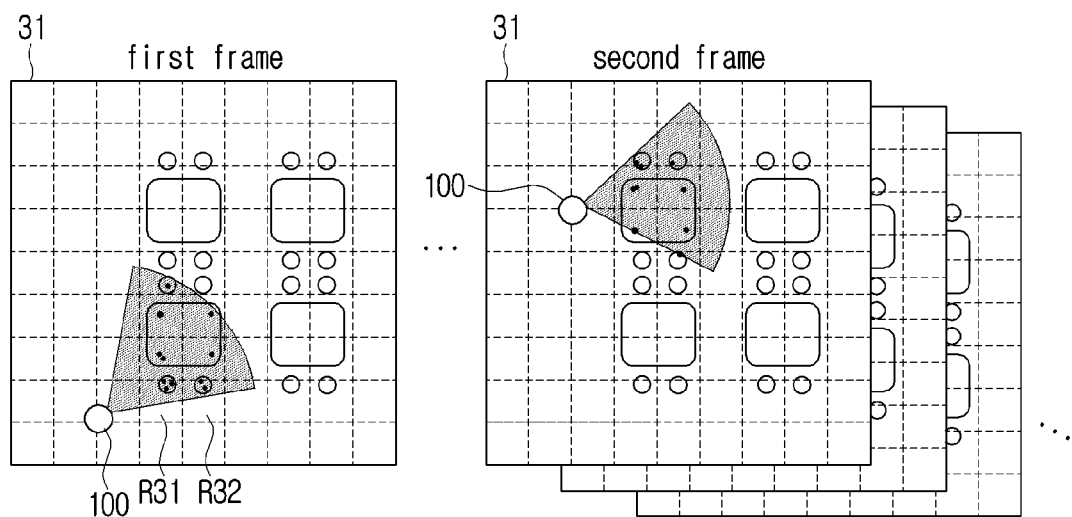
FIG. 3 is a view illustrating a method of calculating an obstacle detection frequency according to an embodiment.

FIG. 3 is a view illustrating a method of calculating an obstacle detection frequency according to an embodiment of the disclosure. FIG. 3 illustrates a state in which a point cloud corresponding to an obstacle detected for each frame is mapped to a first map.

Referring to FIG. 3, the robot 100 may map point clouds corresponding to a plurality of frames acquired through the LiDAR sensor 110 to the first map 31. For example, the robot 100 may map a first point cloud corresponding to a first frame to the first map 31. Also, the robot 100 may map a second point cloud acquired in a second frame after the first frame acquired while the robot 100 is driving to the first map 31.

The robot 100 may identify an area in which an obstacle is detected among a plurality of areas included in the first map 31. For example, the robot 100 may identify the first area R31 and the second area R32. The robot 100 may acquire information on the identified area, match the information with the identified area, and store it. The information on the identified area may include location information (e.g., coordinates) of the identified area and the number and frequency of detecting obstacles in the identified area.

The robot 100 may calculate the number of times an obstacle is detected based on the number of points corresponding to the identified area. For example, since the number of points corresponding to the first area R31 in the first frame is three, the number of times an obstacle is detected in the first area R31 may be three. Since the number of points corresponding to the second area R32 in the first frame is two, the number of times that an obstacle is detected in the second area R32 may be two.

The robot 100 may calculate a frequency at which an obstacle is detected for each area based on the number of points for each area acquired over a plurality of frames. The robot 100 may calculate a frequency at which an obstacle is detected in each area by summing the number of points corresponding to each area for a predetermined time. For example, the robot 100 may calculate a frequency at which an obstacle is detected in the first area R31 by summing the number of points corresponding to the first area R31 for 5 frames.

Figure 4:
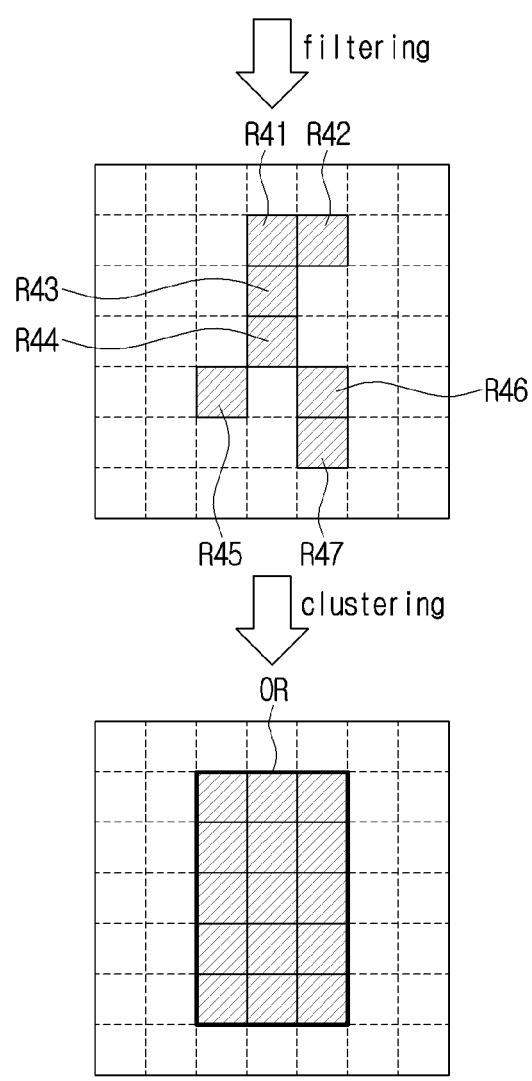
FIG. 4 is a view illustrating a method for acquiring an obstacle area according to an embodiment.

FIG. 4 is a view illustrating a method for acquiring an obstacle area according to an embodiment of the disclosure.

Referring to FIG. 4, the robot 100 may acquire a weight value corresponding to each of a plurality of areas included in the first map. The robot 100 may acquire weight values based on a frequency at which obstacles are detected in each area. The robot 100 may acquire a weight value by inputting the frequency at which an obstacle is detected into a predefined function. For example, the predefined function may be an exponential linear unit (ELU) function.

The robot 100 may filter a partial area based on the weight value. The robot 100 may identify a weight value greater than a predetermined value (e.g., 0.5) and identify areas R41, R42, R43, R44, R45, R46, and R47 corresponding to the identified weight value. For example, an area corresponding to a weight value greater than a predetermined value may be an area in which a permanent occupancy is detected, and an area corresponding to a weight value less than or equal to a predetermined value may be an area in which a temporary occupancy is detected.

The robot 100 may acquire an obstacle area OR by clustering based on the identified areas R41, R42, R43, R44, R45, R46, and R47. The robot 100 may acquire information (e.g., coordinates) on the obstacle area OR and store it in the memory 120. For example, the robot 100 may perform clustering based on a density of the identified areas. Also, the robot 100 may perform clustering using a clustering algorithm.

Figure 5:
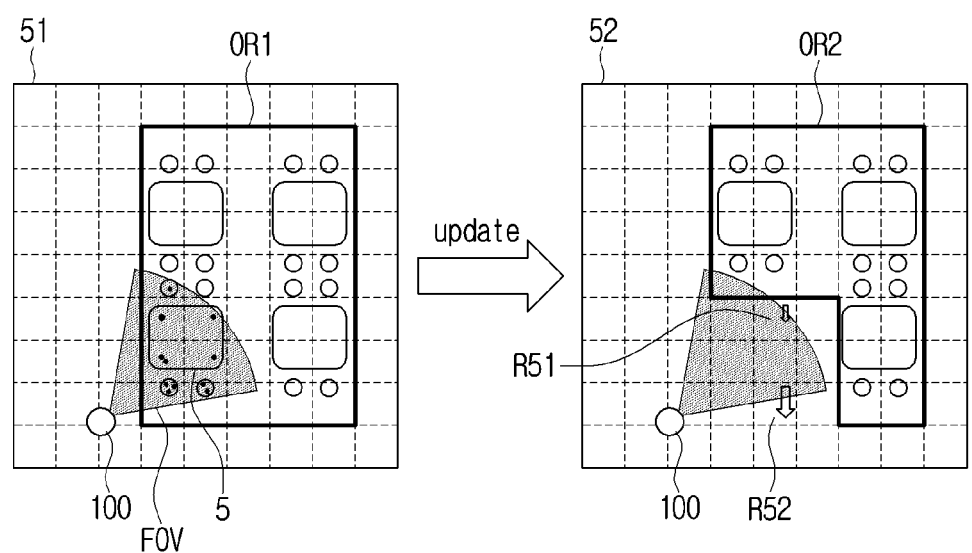
FIG. 5 is a view illustrating a method of updating a driving map according to an embodiment.

FIG. 5 is a view illustrating a method of updating a driving map according to an embodiment.

Referring to FIG. 5, the driving environment may change while the robot 100 is driving. For example, an obstacle 5 may disappear or its location may be changed. The robot 100 may update a driving map by acquiring a new obstacle area. For example, the robot 100 may acquire a second obstacle area OR2 different from a first obstacle area OR1 included in a first driving map 51 before the driving environment is changed. In addition, the robot 100 may generate a second map 52 including the second obstacle area OR2.

The robot 100 may update the number of times that an obstacle in the first obstacle area OR1 is detected based on current posture information on the robot 100, a field of view (FOV) of the LiDAR sensor 110, and information on the first obstacle area OR1. The robot 100 may identify an area included in the first obstacle area OR1 among a plurality of areas corresponding to a direction and a field of view (FOV) in which the robot 100 is currently looking. The robot 100 may identify whether a point corresponding to the identified area exists among point clouds acquired at the current time point. A point could is a set of data points in space, which may represent a three-dimensional (3D) or two-dimensional (2D) shape of an object. For example, when a point corresponding to the identified area does not exist, the robot 100 may reduce the number of times of detecting an obstacle corresponding to the identified area. Accordingly, an obstacle detection frequency corresponding to the identified area and a weight value corresponding to the obstacle detection frequency may be reduced.

The robot 100 may update the number of times of detecting obstacles corresponding to the identified area based on a frequency corresponding to the stored identified area before the driving environment is changed. For example, the identified area may include a first area R51 and a second area R52. A second frequency corresponding to the second area R52 may be greater than a first frequency corresponding to the first area R51. The robot 100 may greatly reduce the number of times of detecting obstacles corresponding to an area as the area corresponding to the greater frequency increases. For example, the robot 100 may reduce the number of obstacle detections corresponding to the first area R51 by a first value, and reduce the number of obstacle detections corresponding to the second area R52 by a second value greater than the first value.

Figure 6:
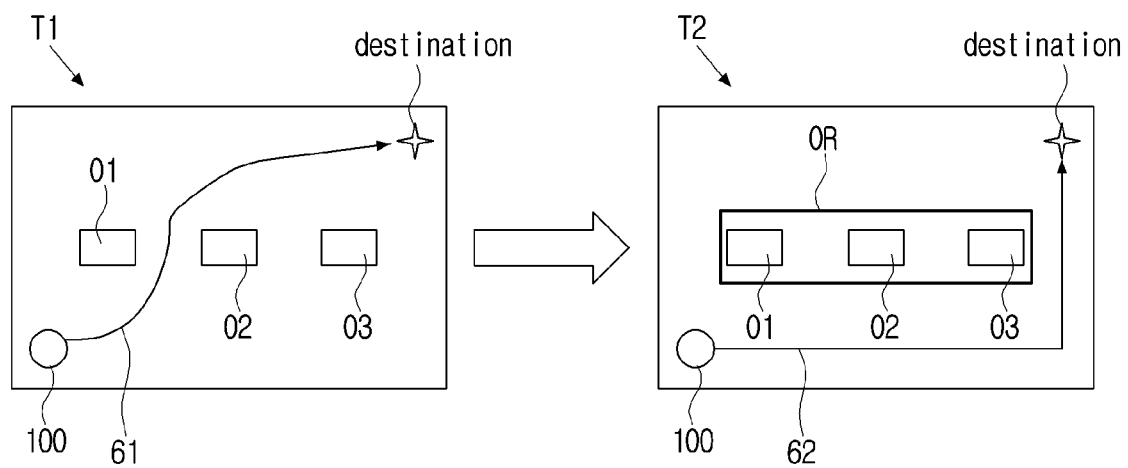
FIG. 6 is a view illustrating a driving scenario of a robot according to an embodiment.
Figure 7:
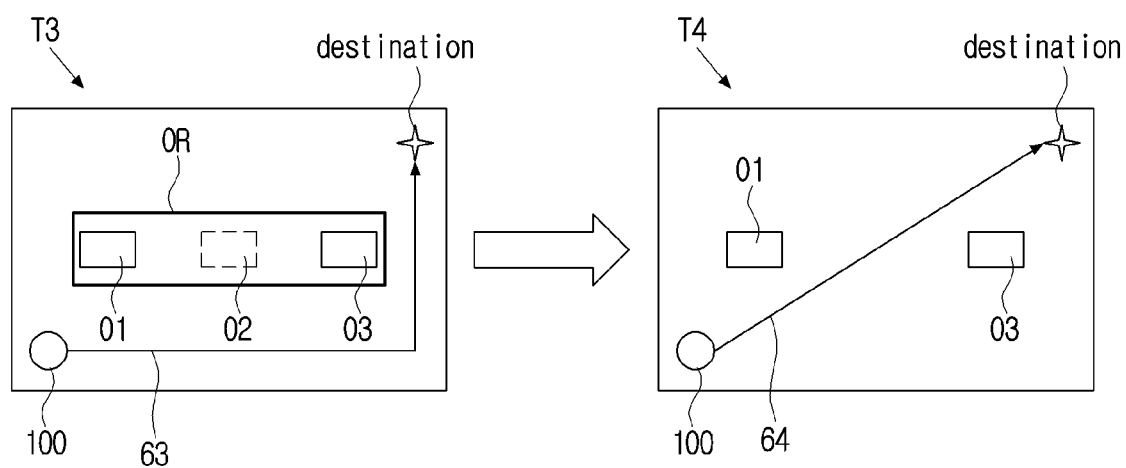
FIG. 7 is a view illustrating a driving scenario of a robot according to an embodiment.

FIGS. 6 and 7 are views illustrating a driving scenario of a robot according to an embodiment of the disclosure.

Referring to FIG. 6, a first time interval T1 may be a time interval before the robot 100 acquires an obstacle area OR. Accordingly, the robot 100 may generate a first route 61 passing between a first obstacle O1 and a second obstacle O2 based on a driving map that does not include the obstacle area OR. As described above, the robot 100 may acquire the obstacle area OR based on an area having a weight value greater than a predetermined value. The first time interval T1 may be a state that the robot 100 has not yet acquired a sufficient point cloud, such that there may be no area having a frequency greater than or equal to a threshold value. In this case, the robot 100 may drive without colliding with obstacles O1, O2, and O3 based on a dynamic obstacle avoidance algorithm.

A second time interval T2 is a time interval after the first time interval T1, and may be a time interval after the driving map of the robot 100 is updated to include the obstacle area OR. In the second time interval T2, the robot 100 may generate a second route 62 bypassing the obstacle area OR including the first obstacle O1, the second obstacle O2, and the third obstacle O3.

Referring to FIG. 7, in a third time interval T3 and a fourth time interval T4, the second obstacle O2 may not exist in a space where the robot 100 is located. For example, the user may remove the second obstacle O2 from the space where the robot 100 is located. In the third time interval T3, a driving map is not yet updated and thus the obstacle area OR may be included. For example, in the third time interval T3, the number of times of detecting an obstacle corresponding to an area in which the second obstacle O2 is detected does not sufficiently decrease, and thus a frequency corresponding to the area in which the second obstacle O2 is detected may be greater than a threshold value, and a weight value corresponding the area in which the second obstacle O2 is detected may be greater than a predetermined value. Accordingly, the robot 100 may generate a third route 63 that bypasses the obstacle area OR despite the second obstacle O2 has disappeared.

In the fourth time interval T4, in which a predetermined time has elapsed after the third time interval T3, the number of obstacle detections corresponding to the area in which the second obstacle O2 is detected decreases, and thus a frequency corresponding to the area in which the second obstacle O2 is detected may be smaller than the threshold value, and a weight value corresponding to the area in which the second obstacle O2 is detected may be smaller than the predetermined value. Accordingly, the driving map of the robot 100 may be updated so as not to include the obstacle area OR. Accordingly, the robot 100 may generate a fourth route 64 passing between the first obstacle O1 and the third obstacle O3.

Figure 8:
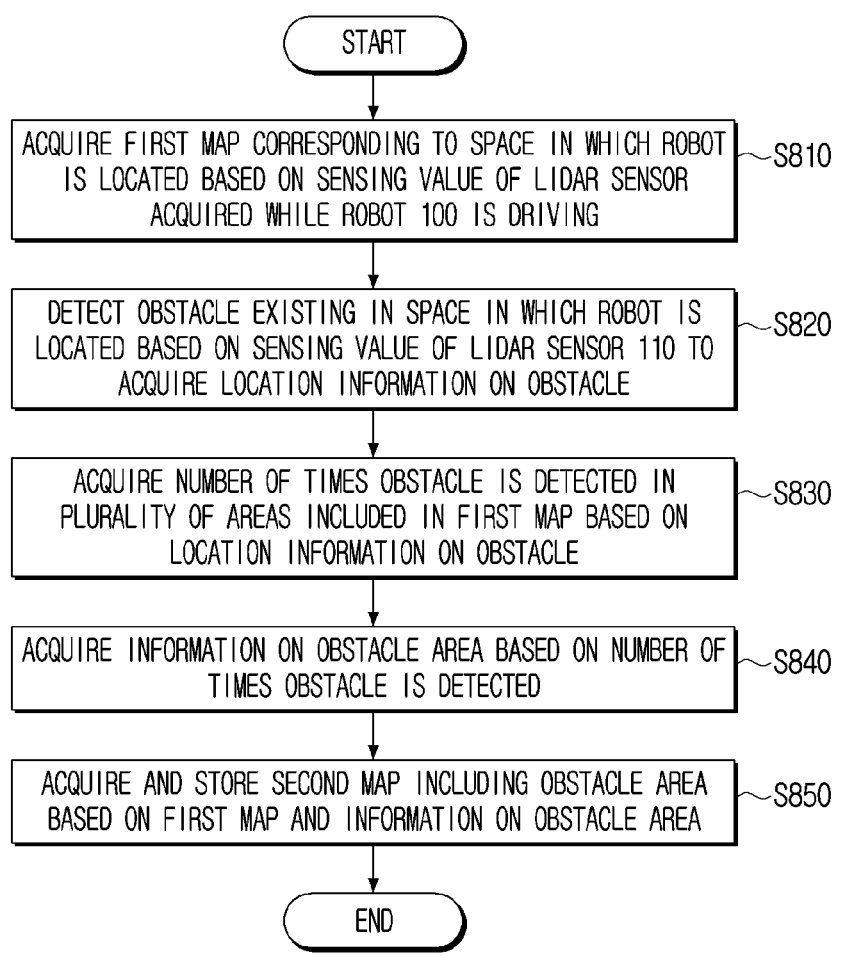
FIG. 8 is a flowchart illustrating a method for controlling a robot according to an embodiment.

FIG. 8 is a flowchart illustrating a method for controlling a robot according to an embodiment of the disclosure.

Referring to FIG. 8, the robot 100 may acquire a first map corresponding to a space in which the robot is located based on a sensing value of the LiDAR sensor acquired while the robot 100 is driving (operation S810). The robot 100 may generate a first map by applying the simultaneous localization and mapping (SLAM) algorithm to point cloud information acquired through the LiDAR sensor 110.

The robot 100 may detect an obstacle existing in a space in which the robot is located based on the sensing value of the LiDAR sensor 110 to acquire location information on the detected obstacle (operation S820). The robot 100 may acquire relative location information between the robot 100 and the obstacle based on the sensing value acquired through the LiDAR sensor 110. The robot 100 may acquire location information on the robot 100 by applying the simultaneous localization and mapping (SLAM) algorithm to point cloud information acquired through the LiDAR sensor 110. The robot 100 may acquire coordinates of an obstacle on the first map based on relative location information between the robot 100 and the obstacle and the location information on the robot 100.

The robot 100 may acquire the number of times occupancy has occurred by an obstacle (or any obstacle) in each of a plurality of areas included in the first map, based on the location information on the obstacle (operation S830). The robot 100 may map the point cloud corresponding to the obstacle to the first map. The robot 100 may acquire the number of obstacles detected based on the number of points, respectively, corresponding to a plurality of areas included in the first map.

The robot 100 may acquire information on the obstacle area based on the number of times the obstacle is detected (operation S840). The robot 100 may calculate an obstacle detection frequency by summing the number of obstacle detections acquired for a predetermined time. The robot 100 may assign a weight value corresponding to the obstacle detection frequency to each of the plurality of areas. The robot 100 may identify an area having a weight value greater than a predetermined value and cluster the identified area to define an obstacle area.

The robot 100 may calculate the frequency at which the obstacle is detected in the plurality of areas based on the number of times the obstacle is detected. The robot 100 may identify at least one area in which the frequency in which the obstacle is detected is greater than a threshold value among the plurality of areas. The robot 100 may determine the obstacle area based on information on at least one area.

The robot 100 may identify a plurality of coordinates corresponding to a plurality of locations where the obstacle is detected based on the location information on the obstacle. The robot 100 may perform clustering on the plurality of identified coordinates based on a density of the plurality of coordinates identified in the plurality of areas to define a cluster composed of at least some of the plurality of identified coordinates. The robot 100 may determine an area corresponding to the plurality of coordinates included in the defined group as the obstacle area.

The robot 100 may acquire and store a second map including the obstacle area based on the first map and the information on the obstacle area (operation S850). In addition, the robot 100 may generate a driving route that bypasses the obstacle area based on the second map.

Figure 9:
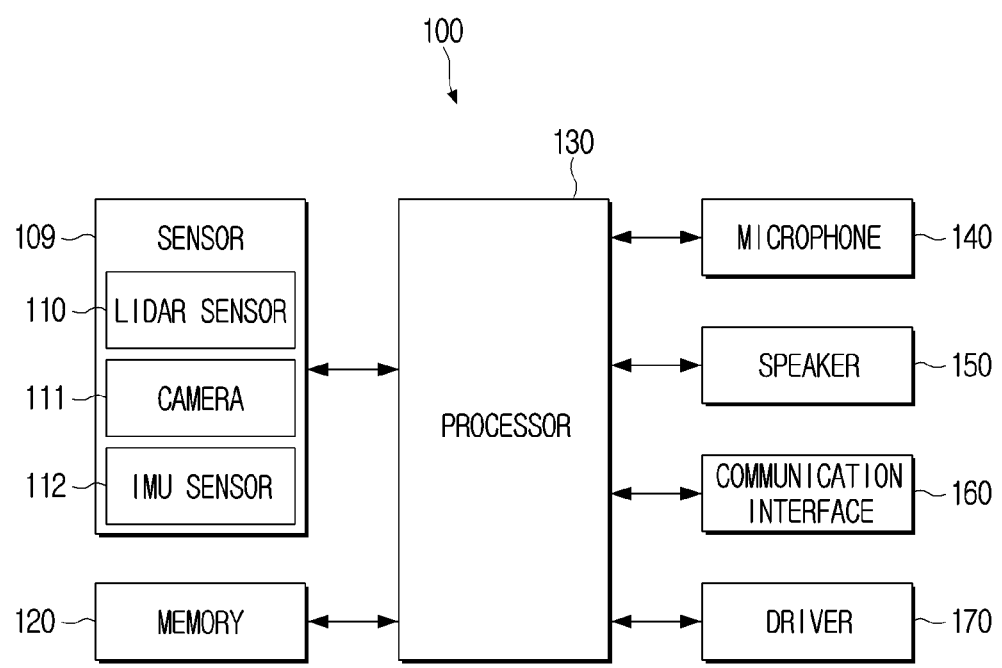
FIG. 9 is a block diagram illustrating a configuration of a robot according to an embodiment.

FIG. 9 is a block diagram illustrating a configuration of a robot according to an embodiment of the disclosure.

Referring to FIG. 9, the robot 100 may include a sensor 109, a memory 120, a processor 130, a microphone 140, a speaker 150, a communication interface 160, and a driver 170. A description overlapping with FIG. 2 will be omitted.

The sensor 109 may include a camera 111 and an inertial measurement unit (IMU) sensor 112. The camera 111 is configured to acquire an image of the surroundings of the robot 100. The camera 111 may include various image sensors. For example, the camera 111 may include at least one of a complementary metal oxide semiconductor (CMOS) image sensor and a charge coupled device (CCD) image sensor. The IMU sensor 112 may include a gyro sensor and a geomagnetic sensor. The processor 130 may acquire posture information on the robot 100 based on a sensing value of the IMU sensor 112.

The microphone 140 may acquire the user's voice. The processor 130 may control an operation of the robot 100 based on the user's voice acquired through the microphone 120. For example, when a voice command for updating a driving map (e.g., "update the driving map") is acquired, the processor 130 may update the driving map. For this operation, a natural language processing module for providing a voice recognition service may be stored in the memory 120.

The speaker 150 refers, for example, to a component that outputs a sound signal. For example, the speaker 150 may output a guide voice (e.g., "Here's the food you ordered"). In another example, the audio output unit 150 may output a voice message corresponding to the user command.

The communication interface 160 may include at least one circuit and communicate with various types of external devices. The communication interface 160 may include a BLE (Bluetooth Low Energy) module, Wi-Fi communication module, cellular communication module, a 3rd generation (3G) mobile communication module, 4th generation (4G) mobile communication module, a 4G long term evolution (LTE) communication module, and a 5th generation (5G) mobile communication module.

The driver 170 may include a wheel for moving the robot 100 and a wheel driving motor for rotating the wheel. In addition, the driver 170 may further include a motor driving circuit for supplying a driving current to the wheel driving motor, a power transmission module for transmitting a rotational force of the wheel driving motor to the wheels, a wheel driving motor, or a rotation detection sensor for detecting a rotational displacement and a rotational speed of wheels.

Various exemplary embodiments described above may be embodied in a recording medium that may be read by a computer or a similar apparatus to the computer by using software, hardware, or a combination thereof. In some cases, embodiments described herein may be implemented by the processor itself. In a software configuration, various embodiments described in the specification such as a procedure and a function may be embodied as separate software modules. The software modules may respectively perform one or more functions and operations described in the present specification.

Computers instructions for performing a processing operation according to various exemplary embodiments may be stored on a non-transitory readable medium. When the computer instructions stored in such a non-transitory computer-readable medium are executed by a processor, a specific apparatus may perform a processing operation according to various embodiments described above.

The non-transitory computer readable recording medium refers to a medium that stores data and that can be read by devices. For example, the non-transitory computer-readable medium may be CD, DVD, a hard disc, Blu-ray disc, USB, a memory card, ROM, or the like.

The foregoing exemplary embodiments and advantages are merely exemplary and are not to be construed as limiting the disclosure. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A robot comprising:
   a light detection and ranging (LiDAR) sensor;
   a memory configured to store at least one instruction; and
   at least one processor configured to execute the at least one instruction to:
      acquire, based on a sensing value of the LiDAR sensor, a first map that covers a space where the robot is located,
      detect one or more obstacles existing in the space based on the sensing value of the LiDAR sensor,
      acquire a number of times that each of a plurality of areas in the first map is occupied by the one or more obstacles, based on location information of the one or more obstacles,
      determine an obstacle area based on the number of times that each of the plurality of areas is occupied by the one or more obstacles, and
      acquire a second map indicating the obstacle area on the first map to determine a driving route of the robot based on the second map.

2. The robot of claim 1, wherein the at least one processor is further configured to execute the at least one instruction to:
   obtain an occupancy frequency of each of the plurality of areas, based on the number of times that each of the plurality of areas is occupied by the one or more obstacles,
   acquire a weight value corresponding to each of the plurality of areas based on the occupancy frequency and a predefined function,
   identify at least one area corresponding to the weight value greater than a predetermined value among the plurality of areas, and
   determine the obstacle area based on information of the at least one area.

3. The robot of claim 2, wherein the at least one processor is further configured to execute the at least one instruction to:
   cluster the at least one area to determine the obstacle area including the at least one area.

4. The robot of claim 1, wherein the at least one processor is further configured to execute the at least one instruction to:
   obtain an occupancy frequency of each of the plurality of areas, based on the number of times that each of the plurality of areas is occupied by the one or more obstacles,
   identify at least one area having the occupancy frequency that is greater than a threshold value among the plurality of areas, and
   determine the obstacle area based on information of the at least one area.

5. The robot of claim 1, wherein the at least one processor is further configured to execute the at least one instruction to:
   identify a plurality of coordinates corresponding to a plurality of locations at which the one or more obstacles are detected, based on a density of the plurality of coordinates in the plurality of areas, perform clustering on the plurality of coordinates to define a cluster composed of at least one of the plurality of coordinates, and determine an area corresponding to the plurality of coordinates included in the cluster as the obstacle area.

6. The robot of claim 1, further comprising:

a driver, wherein the at least one processor is further configured to execute the at least one instruction to generate the driving route that bypasses the obstacle area based on the second map, and control the driver such that the robot moves along the driving route.

7. The robot of claim 6, wherein the at least one processor is further configured to execute the at least one instruction to:

acquire an occupancy frequency of each of the plurality of areas based on the sensing value of the LiDAR sensor acquired while the robot moves to a predetermined destination, and update the second map based on the occupancy frequency.

8. The robot of claim 1, wherein the at least one processor is further configured to execute the at least one instruction to:

apply the sensing value of the LiDAR sensor to simultaneous localization and mapping (SLAM) algorithm to acquire location information of the robot, and acquire coordinates of the one or more obstacles on the first map based on the location information of the robot and the location information of the one or more obstacles.

9. A method for controlling a robot including a light detection and ranging (LiDAR) sensor, the method comprising:

acquiring, based on a sensing value of the LiDAR sensor, a first map that covers a space where the robot is located;

detecting one or more obstacles existing in the space based on the sensing value of the LiDAR sensor;

acquiring a number of times that each of a plurality of areas in the first map is occupied by the one or more obstacles, based on location information of the one or more obstacles;

determining an obstacle area based on the number of times that each of the plurality of areas is occupied by the one or more obstacles; and acquiring a second map indicating the obstacle area on the first map to determine a driving route of the robot based on the second map.

10. The method of claim 9, wherein the determining the obstacle area comprises:

obtaining an occupancy frequency of each of the plurality of areas, based on the number of times that each of the plurality of areas is occupied by the one or more obstacles;

acquiring a weight value corresponding to each of the plurality of areas based on the occupancy frequency and a predefined function;

identifying at least one area corresponding to the weight value greater than a predetermined value among the plurality of areas; and determining the obstacle area based on information of the at least one area.

11. The method of claim 10, wherein the determining the obstacle area further comprises clustering the at least one area to determine the obstacle area including the at least one area.

12. The method of claim 9, wherein the determining the obstacle area comprises:

obtaining the an occupancy frequency of each of the plurality of areas, based on the number of times that each of the plurality of areas is occupied by the one or more obstacles;

identifying at least one area having the occupancy frequency that is greater than a threshold value among the plurality of areas, and determining the obstacle area based on information of the at least one area.

13. The method of claim 9, wherein the determining the obstacle area comprises:

identifying a plurality of coordinates corresponding to a plurality of locations at which the one or more obstacles are detected;

based on a density of the plurality of coordinates in the plurality of areas, performing clustering on the plurality of coordinates to define a cluster composed of at least one of the plurality of coordinates, and determining an area corresponding to the plurality of coordinates included in the cluster as the obstacle area.

14. The method of claim 9, further comprising:

generating the driving route that bypasses the obstacle area based on the second map; and controlling a driver of the robot such that the robot moves along the driving route.

15. The method of claim 14, further comprising:

acquiring an occupancy frequency of each of the plurality of areas based on the sensing value of the LiDAR sensor acquired while the robot moves to a predetermined destination; and updating the second map based on the occupancy frequency.

16. A non-transitory computer-readable storage medium storing a program that is executable by at least one processor to perform a method of processing data for motion planning, the method comprising:

acquiring a space map of a target space;

dividing an area of the space map into a plurality of cells;

identifying an occupancy frequency of each of the plurality of cells by counting a number of times that occupancy has occurred in each of the plurality of cells;

identifying two or more cells, each of which has the occupancy frequency higher than or equal to a threshold value, among the plurality of cells;

clustering the two or more cells and at least one neighbor cell of the two or more cells into an integrated obstacle area; and acquiring a driving map based on the space map and the integrated obstacle area.

17. The non-transitory computer-readable storage medium of claim 16, wherein the acquiring the space map of the target space comprises:

acquiring the space map using a light detection and ranging (LiDAR) sensor located in the target space.

18. The non-transitory computer-readable storage medium of claim 16, wherein the dividing the area of the space map into the plurality of cells comprises:

dividing the area of the space map into the plurality of cells in a two-dimensional (2D) grid form.

19. The non-transitory computer-readable storage medium of claim 16, wherein the occupancy frequency of the at least one neighbor cell is lower than the threshold value, and wherein the clustering the two or more cells and the at least one neighbor cell of the two or more cells into the integrated obstacle area comprises:

selecting the at least one neighbor cell, from the plurality of cells to be clustered with the two or more cells, based on distance between the at least one neighbor cell and the two or more cells being less than a predetermined distance.

20. The non-transitory computer-readable storage medium of claim 16, wherein the method further comprises:

based on the driving map, controlling a robot, to move around the integrated obstacle area to reach a destination.

\* \* \* \* \*